US012125293B2

(12) United States Patent
Shi et al.

(10) Patent No.: US 12,125,293 B2
(45) Date of Patent: Oct. 22, 2024

(54) SYSTEM, METHOD, AND VEHICLE FOR RECOGNITION OF TRAFFIC SIGNS

(71) Applicant: GUANGZHOU AUTOMOBILE GROUP CO., LTD., Guangzhou (CN)

(72) Inventors: Xiaosheng Shi, Guangzhou (CN); Jiucai Zhang, Sunnyvale, CA (US); Donghua Zhu, Guangzhou (CN); Jinchi Zhang, Guangzhou (CN); Guorong Li, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 420 days.

(21) Appl. No.: 17/350,251

(22) Filed: Jun. 17, 2021

(65) Prior Publication Data

US 2022/0405517 A1 Dec. 22, 2022

(51) Int. Cl.
*G06V 20/58* (2022.01)
*B60W 40/04* (2006.01)
*G06F 18/25* (2023.01)
*G06N 3/049* (2023.01)
*G06N 3/08* (2023.01)

(52) U.S. Cl.
CPC .......... *G06V 20/582* (2022.01); *B60W 40/04* (2013.01); *G06F 18/25* (2023.01); *G06N 3/049* (2013.01); *G06N 3/08* (2013.01); *B60W 2554/4046* (2020.02)

(58) Field of Classification Search
CPC ...... G06V 20/582; G06V 10/82; G06V 20/58; B60W 40/04; B60W 2554/4046; G06F 18/25; G06N 3/049; G06N 3/08; G06N 3/0442; G06N 3/045; G08G 1/09623
See application file for complete search history.

(56) References Cited

U.S. PATENT DOCUMENTS

| | | | |
|---|---|---|---|
| 2013/0049988 A1* | 2/2013 | Roeber | G08G 1/0967 340/905 |
| 2016/0162743 A1* | 6/2016 | Chundrlik, Jr. | G06V 20/58 348/148 |
| 2019/0156151 A1* | 5/2019 | Wrenninge | G06F 18/214 |

(Continued)

FOREIGN PATENT DOCUMENTS

| | | |
|---|---|---|
| CN | 102956118 A | 3/2013 |
| CN | 103832282 A | 6/2014 |

(Continued)

*Primary Examiner* — Umair Ahsan
(74) *Attorney, Agent, or Firm* — ScienBiziP, P.C.

(57) ABSTRACT

A system and method for recognizing traffic signs during autonomous driving comprises a camera module obtaining a first recognition, a sensor obtains behavior information of the host vehicle and of nearby vehicles and a connected training module generates parameters for traffic sign recognition according to information as to the behavior of the host vehicle and the nearby vehicles. A recurrent neural network module is connected with the training module and the camera module, and outputs a second traffic sign recognition according to the parameters and the first recognition. Training parameters of the second recognition comprise the traffic sign recognition parameters and the first recognition, the accuracy of the training result being improved by combining other sensors to perform traffic sign recognition training.

11 Claims, 5 Drawing Sheets

(56) References Cited

U.S. PATENT DOCUMENTS

2019/0325236 A1* 10/2019 Zaba .................. G06F 16/2246
2019/0332940 A1* 10/2019 Han ....................... G06N 3/048
2021/0089796 A1*  3/2021 Lu ........................ G06V 20/582

FOREIGN PATENT DOCUMENTS

| CN | 109118797 A    |   | 1/2019  |
|----|----------------|---|---------|
| CN | 113096411 A    | * | 7/2021  |
| DE | 102015210117 A1|   | 12/2016 |

* cited by examiner

SYSTEM, METHOD, AND VEHICLE FOR RECOGNITION OF TRAFFIC SIGNS

FIELD

The subject matter herein generally relates to road safety.

BACKGROUND

Detecting and recognizing traffic signs is fundamental when driving. Traffic signs and their recognition is just as fundamental in autonomous driving, and thus autonomous driving technology requires vehicles to recognize traffic signs. At present, the traffic sign recognition technology only adopts a camera to detect and identify the traffic sign, and cannot be combined with vehicle behavior information.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
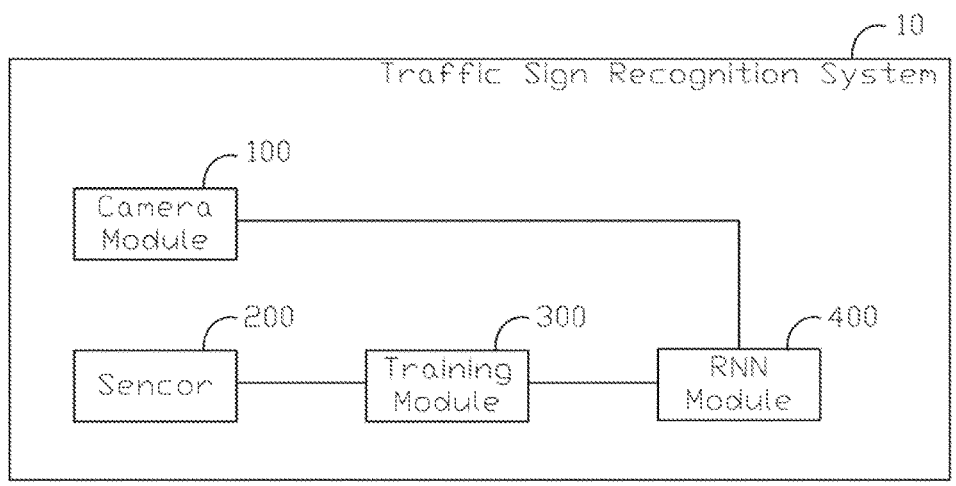
FIG. 1 is a diagram of an embodiment of a traffic sign recognition system applied in autonomous driving.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a traffic sign recognition system 10 according to an embodiment of the disclosure, which includes a camera module 100, a sensor 200, a training module 300, and a Recurrent Neural Network (RNN) module 400. The sensor 200 is connected to the training module 300 and the RNN module 400 sequentially, and the training module 300 is connected to the RNN module 400.

In an embodiment of the present disclosure, the traffic sign recognition system 10 obtains recognition of a traffic sign through the camera module 100. The traffic sign recognition system 10 then obtains information as to behavior of a host vehicle and of nearby vehicles from the sensor 200. The traffic sign recognition system 10 inputs the behavior information of the host vehicle and the nearby vehicles from the sensor 200 to the training module 300. The training module 300 is configured to output a traffic sign recognition parameter to the RNN module 400. The RNN module 400 fuses the recognition obtained by the camera module 100 and the traffic sign recognition parameter from the training module 300, and outputs a recognition of the traffic sign according to information input by the training module 300 and the camera module 100.

In an embodiment of the present disclosure, the sensor 200 includes, but not limited to, radar, localizer, and lidar sensors. Since the traffic sign has the same constraint effect on the host vehicle and the nearby vehicles, a recognition rate of the traffic sign can be improved by analyzing behaviors of the host vehicle and the nearby vehicles. For example, after the camera module 100 detects a traffic sign, the sensor 200 collects a behavior information of the host vehicle and the nearby vehicles, and the training module 300 performs learning and information filtering according to the vehicle behavior and detected traffic signs. The training module 300 further outputs the learned information to the RNN module 400. The RNN module 400 determines a type of the traffic sign according to the information obtained from the camera module 100 and trained information from the training module 300.

In an embodiment of the present disclosure, the behavior information of the host vehicle and the nearby vehicles collected by the sensor 200 includes, but is not limited to, the locations, speeds and traffic light information of the host vehicle and of the nearby vehicles. The sensors 200 integrate the acquired information to form parameters of the host vehicle and the nearby vehicles. The parameters of the host vehicle and the nearby vehicles output by the sensor 200 to the training module 300 are $X=\{(X, y), \Phi, v, \omega, a, (w, h), c\}$. In such formula, parameter $(x, y)$ represents the location of the center of the vehicle. Parameter $\Phi$ represents the yaw angle. Parameter $v$ represents the speed, parameter $\omega$ represents the yaw rate. Parameter $a$ represents the acceleration of the vehicle. Parameter $(w, h)$ represents the width and height of the vehicle. Parameter $c$ represents the category of the vehicle. In one embodiment, only information of the vehicle in motion is collected to train the training module 300 to recognize the traffic sign according to the host vehicle and the nearby vehicles.

Figure 2:
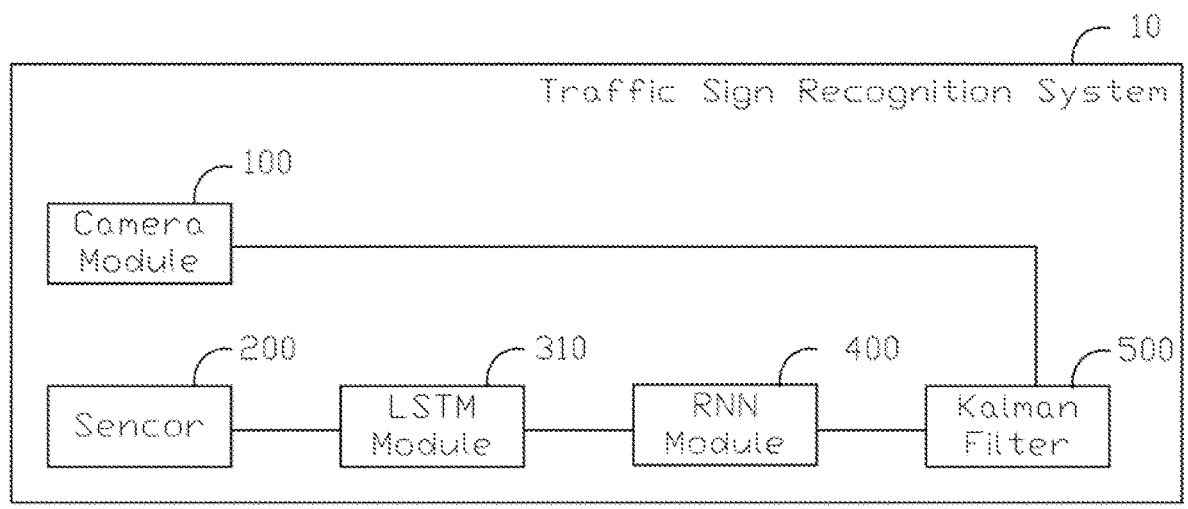
FIG. 2 is a diagram of another embodiment of a traffic sign recognition system.

Referring to FIG. 2, in one embodiment, the training module 300 is a Long Short-Term Memory network (LSTM) module 310. The traffic sign recognition system 10 further includes a Kalman filter 500. The LSTM module 310 is connected to the sensor 200 and the RNN module 400. The Kalman filter 500 is connected to the RNN module 400 and the camera module 100 for outputting a traffic sign recognition.

In an embodiment of the present disclosure, the Kalman filter 500 can fuse a traffic sign recognition result (hereinafter, referred to as a first recognition result) acquired from the camera module 100 with a traffic sign recognition result (hereinafter, referred to as a second recognition result) inferred by the sensor 200 via the behavior of the host vehicle and the surrounding vehicles. Therefore, the Kalman filter 500 can fuse the two recognition results to obtain a new traffic sign recognition result (hereinafter, referred to as a third recognition result). Since the nearby vehicles view the traffic signs from different angles, taking their behavior into account reduces the likelihood of single traffic sign recognition errors. Therefore, the traffic sign recognition result has higher robustness and accuracy compared with related art which recognize traffic signs merely by camera.

In an embodiment of the disclosure, the Kalman filter 500 can fuse the first recognition result and the second recognition result, that is, the traffic sign recognition result deduced according to the image recognition and the behavior of the host vehicle and the nearby vehicles, so that the traffic sign recognition system 10 may have higher accuracy.

In one embodiment of the present disclosure, the LSTM module 310 generally has a two-layer structure. One layer of the structure is an information input layer, and the other layer is an information filtering layer. The sensor 200 may continuously collect the behavior information of the host vehicle and the nearby vehicles, or collect the behavior information of the host vehicle and the nearby vehicles at regular intervals. The sensor 200 inputs the behavior information of the host vehicle and the nearby vehicles to the information input layer of the LSTM module 310.

In this embodiment, when the sensor 200 inputs the behavior information of the host vehicle and the nearby vehicles to the LSTM module 310, different weightings are set to the behavior information of the host vehicle and the nearby vehicles. For example, a weighting of the host vehicle information and a weighting of the nearby vehicles behavior information may be set to 1:1, to increase an importance of the behavior information of the host vehicle in the training process. In other embodiments, the host vehicle and each nearby vehicle may also have the same weighting according to the number of nearby vehicles and the host vehicle. The weightings of the host vehicle and the nearby vehicles may be set in a gate structure of the information filtering layer of the LSTM module 310.

In one embodiment, if there are no other moving vehicles in the vicinity of the host vehicle, training may be performed based only on the behavior information of the host vehicle. Nevertheless, the training result may be inaccurate due to the training based only on the behavior information of the host vehicle. Therefore, if there are no other vehicles in motion near the host vehicle in a time period and there are moving nearby vehicles in another time period, the weighting of the period in which there are more other vehicles is increased, which can improve the accuracy of the training result. That is, the overall weight of the behavior information when only the host vehicle is present is reduced by the gate structure at the information filtering layer. The overall weighting when many nearby vehicles are present is increased, and the accuracy of the training result is improved.

In this embodiment, the sensor 200 is also used to obtain a driver behavior information of the host vehicle and the nearby vehicles. The LSTM module 310 then filters the driver behavior information and delete information that may adversely affect the training result. Due to the characteristics of the LSTM network, the driver behavior information can be added or deleted from a cellular state by the gate structure of the information filtering layer. That is, the LSTM module 310 may retain the driver behavior information that needs to be retained, and delete the driver behavior information that may adversely affect the training result, so as to implement the filtering of the driver behavior information.

For example, while analyzing the driver behavior information, the analysis may be affected by the behavior of a driver who does not obey the traffic rules. For example, the driver behavior that does not obey the traffic rules may cause mis-learning and affects an inaccuracy of the RNN module 400. Therefore, the driver behavior information needs to be filtered. For example, there may be a right turn prohibition traffic sign on the road. Most of the behaviors of the host vehicle driver and the drivers of the neighboring vehicles will drive straight on or may turn left, as captured by the sensor 200. Thus, when there is actually a right turn behavior, it can be considered as a driver behavior that does not obey the traffic rules. The LSTM module 310 can then remove the right turn as behavior information from the cell state through the gate structure of the information filtering layer, which improves the recognition accuracy of the RNN module 400 and reduces the training time of the RNN module 400.

In an embodiment of the present disclosure, if the behaviors of the host vehicle and of the nearby vehicles are abnormal due to unexpected factors, the weighting of the vehicle behaviors can also be reduced. For example, when a traffic accident occurs, surrounding vehicles may decelerate and bypass the accident vehicle, even though this does not obey the information from the traffic sign. The LSTM module 310 may recognize the behavior as a corresponding deceleration bypass traffic identifier, which may cause a misrecognition. Therefore, when the abnormal state is detected, the weighting of the recognition in the period is reduced, and the recognition accuracy of the traffic sign recognition system 10 can be improved.

Figure 3:
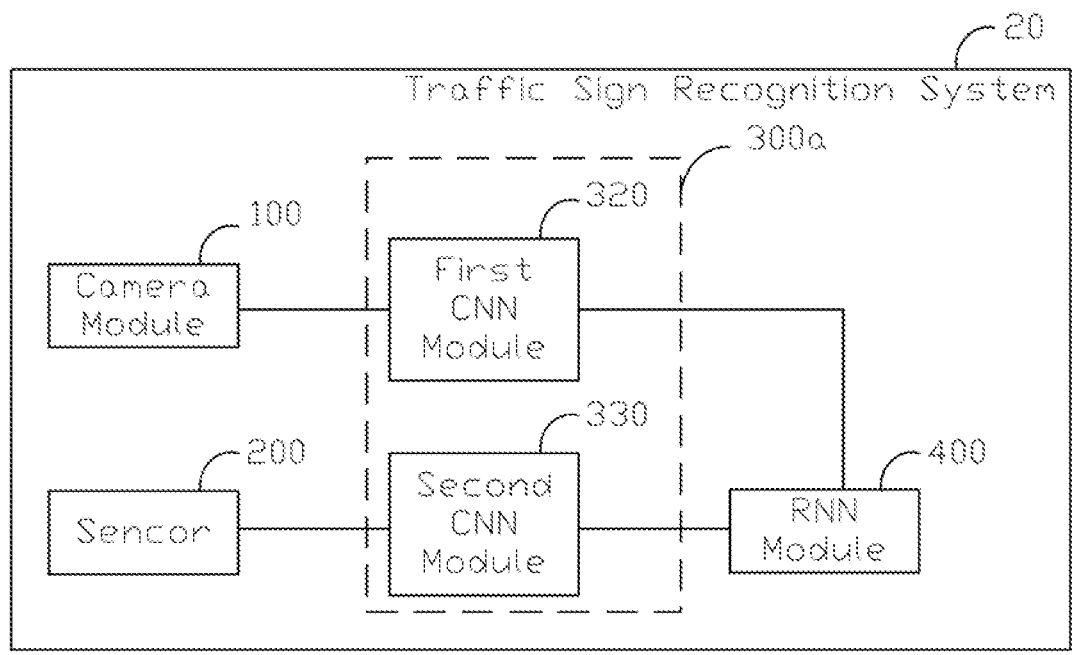
FIG. 3 is a diagram of another embodiment of a traffic sign recognition system.

FIG. 3 illustrates a traffic sign recognition system 20 provided by another embodiment of the present disclosure. In one embodiment, the traffic sign recognition system 20 includes a camera module 100, a sensor 200, a CNN module 300a, and an RNN module 400.

In this embodiment, the traffic sign recognition system 20 is similar to the traffic sign recognition system 10 and only has a difference in that the training module 300 is a CNN module 300a. The CNN module 300a includes a first CNN module 320 and a second CNN module 330. The first CNN module 320 is connected to the camera module 100 and the RNN module 400. The second CNN module 330 is connected to the sensor 200 and the RNN module 400.

In one embodiment, the image information obtained by the camera module 100 can be input to the first CNN module 320 to acquire the first traffic sign recognition result. The first CNN module 320 then inputs the first traffic sign recognition result to the RNN module 400. The sensor 200 will obtain the behavior information of the host vehicle and the nearby vehicles, and input the behavior information to the second CNN module 330, so as to acquire the traffic sign recognition features through the second CNN module 330. The second CNN module 330 then inputs the traffic sign recognition features to the RNN module 400, and the RNN module 400 outputs a second traffic sign recognition feature result.

In this embodiment, because the first CNN module 320 and the second CNN module 330 are introduced, the first CNN module 320 may directly process the image information acquired by the camera module 100, and perform feature extraction according to the image information. The second CNN module 330 is trained on the vehicle behavior information of the host vehicle and the nearby vehicles acquired by the sensors 200 to acquire a traffic sign recognition result based on the vehicle behavior information of the host vehicle and the nearby vehicles. The RNN module 400 applies training to obtain a traffic sign recognition result according to the information input by the first CNN module 320 and the second CNN module 330. The traffic sign recognition system 20 does not need to perform fusion of features according to the extracted traffic signs, so that the applicability of the traffic sign recognition system 20 can be improved, and traffic sign recognize training can be performed according to the original images acquired by the camera module 100.

Figure 4:
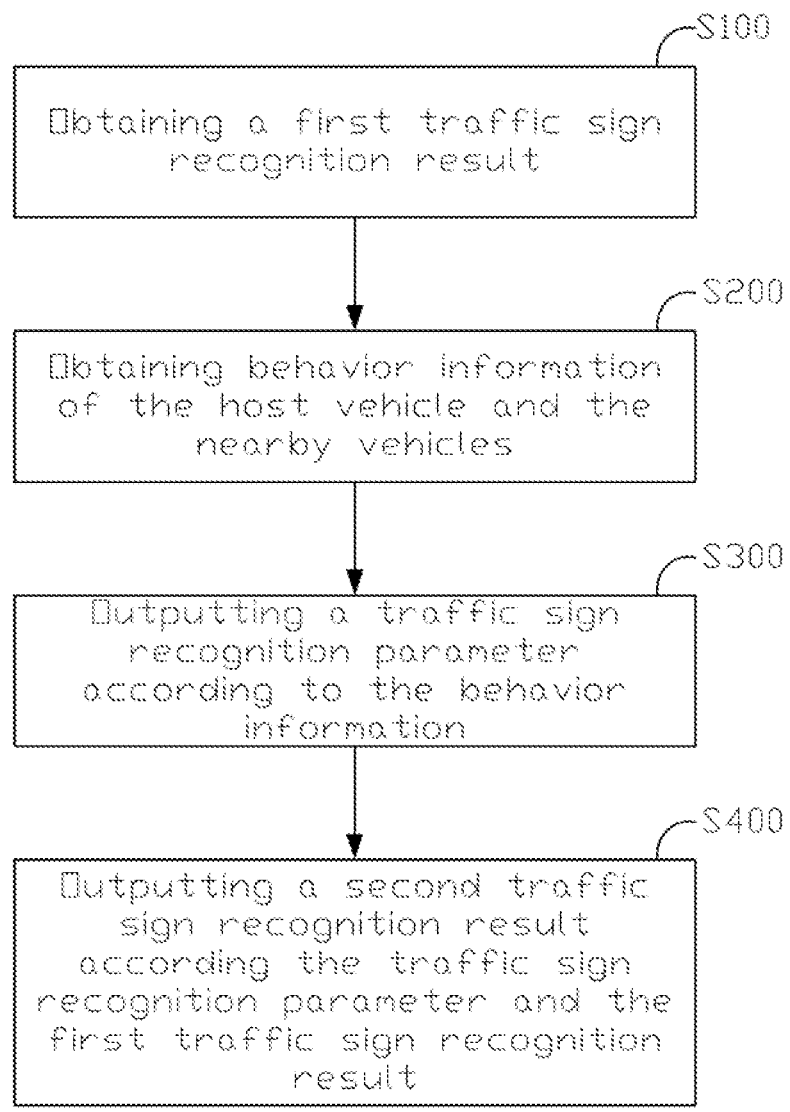
FIG. 4 is a flowchart of an embodiment of a method for traffic sign recognition in an autonomous vehicle.

FIG. 4 illustrates a flowchart of a traffic sign recognition method. The embodiment is provided by way of example, as there are a variety of ways to carry out the method. The method described below can be carried out using the configurations illustrated in FIGS. 1-3, for example, and various elements of these figures are referenced in explaining the embodiment. Each block shown in FIG. 4 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. The embodiment can begin at block S100.

At block S100, a first traffic sign recognition result is acquired.

In one embodiment, the first traffic sign recognition result is acquired by the camera module 100.

At block S200, a behavior information of the host vehicle and the nearby vehicles is required.

In one embodiment, the behavior information of the host vehicle and the nearby vehicles is acquired by the sensor 200.

In one embodiment, in the embodiment of the present disclosure, the order of step S100 and step S200 is not limited.

At block S300, a traffic sign recognition parameter is generated.

In one embodiment, the training module 300 may be trained by the behavior information of the host vehicle and the nearby vehicles collected by the sensor 200 to output the traffic sign recognition parameters to the RNN module 400. In one embodiment, the method of outputting the traffic sign recognition parameters is the same as that of the traffic sign recognition system 10 and the traffic sign recognition system 20, and will not be described herein.

At block S400, a second traffic sign recognition result is output.

In one embodiment, the first traffic sign recognition result from the camera module 100 and the output traffic sign recognition parameter from the training module 300 may be received by the RNN module 400, and a second traffic sign recognition can be generated by the RNN module 400.

In one embodiment, the training module 300 may be the LSTM module 310 shown in FIG. 2 or the second CNN module 330 shown in FIG. 3, and specific functions and electrical connection relationships thereof can be described with reference to FIG. 2 and FIG. 3, which are not repeated herein.

The traffic sign recognition system 10 provided in the embodiment of the present disclosure may be used in automated driving at the level of L3, L4, or L5, and can recognition a traffic sign according to the behavior of surrounding vehicles and camera modules.

Figure 5:
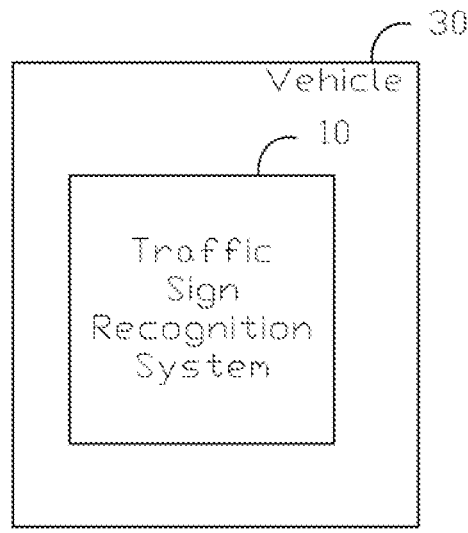
FIG. 5 is a diagram of an embodiment of a self-driving vehicle.

As shown in FIG. 5, in one embodiment, the present disclosure also provides a vehicle 30. The vehicle 30 includes the traffic sign recognition system 10. The vehicle 30 can recognize the traffic sign according to the information collected by the different types of sensors on the vehicle. Comparing with the related technology in which the traffic sign recognition is recognized only through the camera, the accuracy of the training result can be improved by combining other sensors to perform traffic sign recognize training.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A traffic sign recognition system applied to vehicle, the traffic sign recognition system comprising:
    a camera module configured to obtain a first traffic sign recognition result;
    a sensor configured to obtain a behavior information of a host vehicle and nearby vehicles;
    a training module connecting to the sensor, the training module outputting traffic sign recognition parameters according to the behavior information of the host vehicle and the nearby vehicles; and
    a recurrent neural network module connecting to the training module and the camera module,
    wherein the recurrent neural network module outputs a second traffic sign recognition result according to the traffic sign recognition parameters and the first traffic sign recognition result,
    the training module is a long-short term memory artificial neural network module, the sensor is further configured to obtain a driver behavior information of the host vehicle and the nearby vehicles, the long-short term memory artificial neural network module filters the driver behavior information to delete an information that adversely affects training,
    the long-short term memory artificial neural network module comprises an information input layer and an information filtering layer, the information input layer is connected to the sensor to acquire the behavior information of the host vehicle and the nearby vehicles, and the information filtering layer outputs the traffic sign recognition parameters according to the behavior information of the host vehicle and the nearby vehicles, and
    the information filtering layer comprises a gate structure, and the driver behavior information is added or deleted from a cellular state by the gate structure of the information filtering layer;
    wherein the traffic sign recognition system further comprises a Kalman filter, the Kalman filter is connected to the recurrent neural network module, the Kalman filter is configured to fuse the first traffic sign recognition result and the second traffic sign recognition result to generate a third traffic sign recognition result;
    if the behavior information of the host vehicle and nearby vehicles is abnormal, a weighting of vehicle behaviors in fusing the first traffic sign recognition result and the second traffic sign recognition result is reduced.

2. The traffic sign recognition system of claim 1, wherein the traffic sign recognition parameters comprise:
    location of vehicle center, yaw angle, speed, yaw rate, acceleration of the vehicle, width and height of the vehicle, and category of the vehicle.

3. The traffic sign recognition system of claim 1, wherein the training module comprises a first convolutional neural network module and a second convolutional neural network module, the first convolutional neural network module is connected to the camera module and the recurrent neural network module, and the second convolutional neural network module is connected to the sensor and the recurrent neural network module, the camera module obtains an image information, the first convolutional neural network module generates a first traffic sign recognition result according to the image information; and the second convolutional neural network module outputs the traffic sign recognition parameters according to the behavior information of the host vehicle and the nearby vehicles.

4. A traffic sign recognition method comprising:

obtaining a first traffic sign recognition result;

obtaining behavior information of a host vehicle and nearby vehicles;

outputting traffic sign recognition parameters according to the behavior information of the host vehicle and the nearby vehicles;

outputting a second traffic sign recognition result according to the traffic sign recognition parameters and the first traffic sign recognition result, and training parameters of the second traffic sign recognition result comprise the traffic sign recognition parameters and the first traffic sign recognition result; and obtaining a driver behavior information of the host vehicle and the nearby vehicles, filtering the driver behavior information to delete an information that adversely affects training; and outputting the traffic sign recognition parameters according to the behavior information of the host vehicle and the nearby vehicles, fusing the first traffic sign recognition result and the second traffic sign recognition result to generate a third traffic sign recognition result;

reducing a weighting of vehicle behaviors in fusing the first traffic sign recognition result and the second traffic sign recognition result if the behavior information of the host vehicle and nearby vehicles is abnormal;

wherein the driver behavior information is added or deleted from a cellular state by a gate structure of an information filtering layer.

5. The traffic sign recognition method of claim 4, the traffic sign recognition parameters comprise:

location of vehicle center, yaw angle, speed, yaw rate, acceleration of the vehicle, width and height of the vehicle, and category of the vehicle.

6. The traffic sign recognition method of claim 5, further comprising:

obtaining an image information;

outputting a first traffic sign recognition result according to the image information.

7. The traffic sign recognition method of claim 6, further comprising:

outputting the traffic sign recognition parameters according to the behavior information of the host vehicle and the nearby vehicles.

8. The traffic sign recognition method of claim 4, further comprising:

fusing the first traffic sign recognition result and the second traffic sign recognition result to generate a third traffic sign recognition result.

9. A vehicle comprising:

a traffic sign recognition system, the traffic sign recognition system comprising:

a camera module configured to obtain a first traffic sign recognition result;

a sensor configured to obtain behavior information of a host vehicle and nearby vehicles;

a training module connecting to the sensor, the training module outputting traffic sign recognition parameters according to the behavior information of the host vehicle and the nearby vehicles; and a recurrent neural network module connecting to the training module and the camera module, wherein the recurrent neural network module outputs a second traffic sign recognition result according to the traffic sign recognition parameters and the first traffic sign recognition result, the training module is a long-short term memory artificial neural network module, the sensor is further configured to obtain a driver behavior information of the host vehicle and the nearby vehicles, the long-short term memory artificial neural network module filters the driver behavior information to delete an information that adversely affects training;

the long-short term memory artificial neural network module comprises an information input layer and an information filtering layer, the information input layer is connected to the sensor to acquire the behavior information of the host vehicle and the nearby vehicles, and the information filtering layer outputting outputs the traffic sign recognition parameters according to the behavior information of the host vehicle and the nearby vehicles, and the information filtering layer comprises a gate structure, and the driver behavior information is added or deleted from a cellular state by the gate structure of the information filtering layer;

wherein the traffic sign recognition system further comprises a Kalman filter, the Kalman filter is connected to the recurrent neural network module, the Kalman filter is configured to fuse the first traffic sign recognition result and the second traffic sign recognition result to generate a third traffic sign recognition result;

if the behavior information of the host vehicle and nearby vehicles is abnormal, a weighting of vehicle behaviors in fusing the first traffic sign recognition result and the second traffic sign recognition result is reduced.

10. The vehicle of claim 9, wherein the traffic sign recognition parameters comprise:

position of vehicle center, yaw angle, speed, yaw rate, acceleration of the vehicle, width and height of the vehicle, and category of the vehicle.

11. The vehicle of claim 9, wherein the training module comprises a first convolutional neural network module and a second convolutional neural network module, the first convolutional neural network module is connected to the camera module and the recurrent neural network module, and the second convolutional neural network module is connected to the sensor and the recurrent neural network module, the camera module obtains an image information, the first convolutional neural network module generates a first traffic sign recognition result according to the image information, and the second convolutional neural network module outputs the traffic sign recognition parameters according to the behavior information of the host vehicle and the nearby vehicles.

* * * * *